(12) United States Patent
Ito et al.

(10) Patent No.: US 7,717,559 B2
(45) Date of Patent: May 18, 2010

(54) METHOD FOR DESIGNING SPECTACLE LENS, AND SPECTACLES

(75) Inventors: Ayumu Ito, Minowa machi (JP); Tadashi Kaga, Minowa machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/238,262

(22) Filed: Sep. 25, 2008

(65) Prior Publication Data
US 2009/0086162 A1  Apr. 2, 2009

(30) Foreign Application Priority Data
Sep. 28, 2007  (JP) .............................. 2007-254293
Jul. 2, 2008  (JP) .............................. 2008-173311

(51) Int. Cl.
*G02C 13/00* (2006.01)
(52) U.S. Cl. ....................................... 351/177; 351/159
(58) Field of Classification Search ................ 359/159, 359/163–177; 351/204, 159, 163–177
See application file for complete search history.

(56) References Cited

U.S. PATENT DOCUMENTS

| 1,741,536 | A | 12/1929 | Rayton |
| 5,576,778 | A | 11/1996 | Fujie et al. |
| 6,129,435 | A | 10/2000 | Reichow et al. |
| 6,789,896 | B2 | 9/2004 | Morris et al. |
| 7,070,274 | B2 | 7/2006 | Kamishita et al. ............ 351/159 |
| 2003/0086055 | A1 | 5/2003 | Morris et al. |
| 2006/0098161 | A1 | 5/2006 | Dumange et al. |
| 2008/0024719 | A1 | 1/2008 | Kamishita et al. ........... 351/176 |
| 2009/0103046 | A1* | 4/2009 | Welk et al. .................. 351/204 |

FOREIGN PATENT DOCUMENTS

| EP | 1657587 A1 | 5/2006 |
| JP | 2005-284059 | 10/2005 |
| JP | 2006-023584 | 1/2006 |
| JP | 2007-093636 | 4/2007 |
| JP | 2008-026776 | 2/2008 |
| JP | 2008-058576 | 3/2008 |
| JP | 2008-158494 | 7/2008 |
| WO | 99052480 A1 | 10/1999 |
| WO | 2006056261 A1 | 6/2006 |
| WO | 2007128925 A1 | 11/2007 |

OTHER PUBLICATIONS

European Search Report for corresponding European application 08017058.2-2217 lists the references above, Dec. 19, 2008.

* cited by examiner

*Primary Examiner*—Darryl J Collins
(74) *Attorney, Agent, or Firm*—Hogan & Hartson LLP

(57) ABSTRACT

A method for designing a spectacle lens that includes an optical convex surface on an object side of the spectacle lens and an optical concave surface on an eye side of the spectacle lens and is mounted in a spectacle frame in a manner tilting with respect to a forward sight line, the optical convex surface being spherical, the optical concave surface being optically curved according to a prescription, the method including: defining a design reference point at an intersection of the optical concave surface and the forward sight line; and determining an angle formed by a tangent line at the design reference point and a perpendicular plane perpendicular to the forward sight line as a lens tilt angle θ with which the spectacle lens is mounted in the spectacle frame.

5 Claims, 4 Drawing Sheets

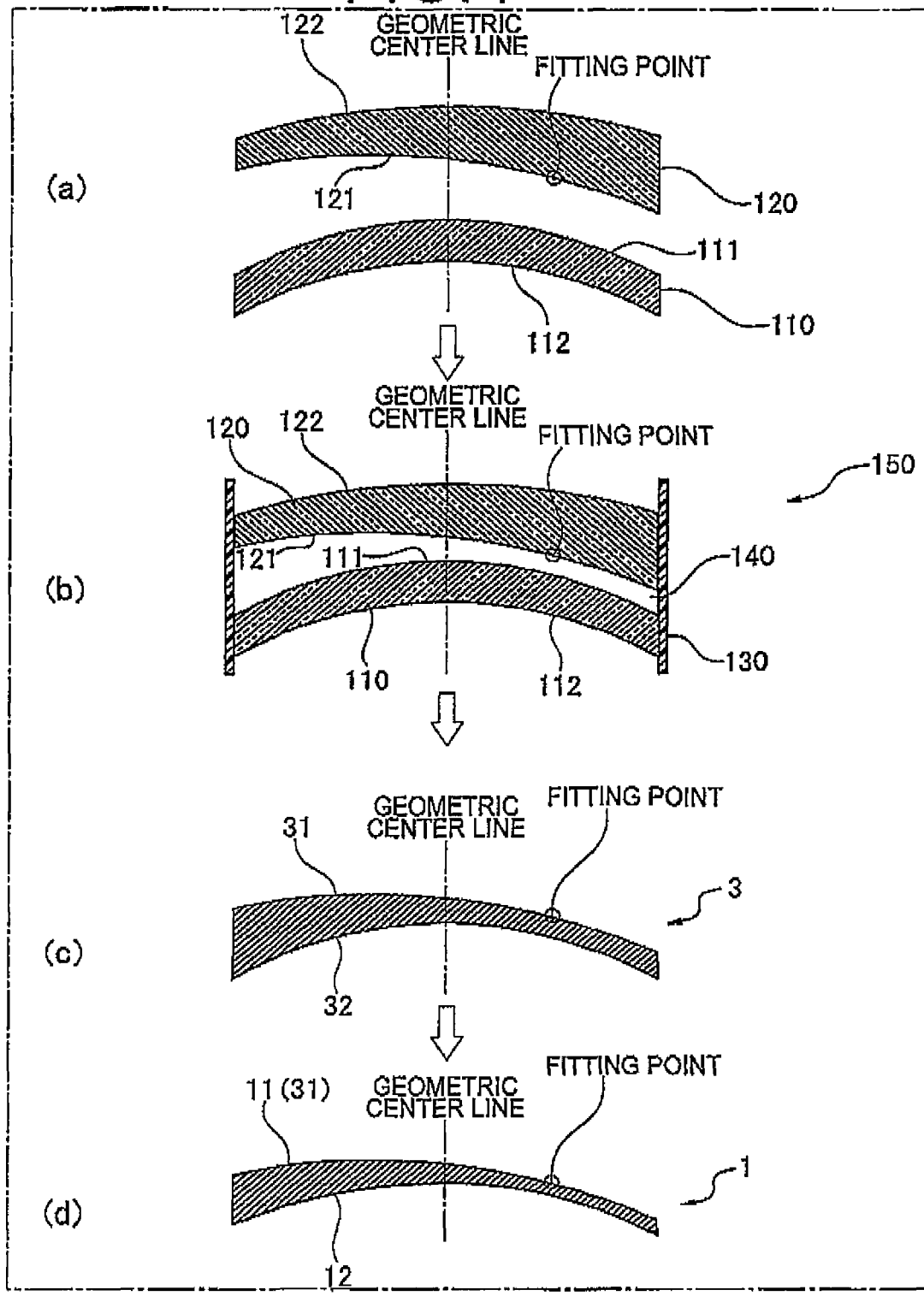

METHOD FOR DESIGNING SPECTACLE LENS, AND SPECTACLES

The entire disclosure of Japanese Patent Application No. 2007-254293, filed Sep. 28, 2007 and No. 2008-173311, filed Jul. 2, 2008 is expressly incorporated by reference herein.

BACKGROUND

1. Technical Field

The present invention relates to a method for designing a spectacle lens to be mounted in a spectacle frame having a large bend angle such as a wraparound type spectacle frame.

2. Related Art

In recent years, a spectacle frame of the wraparound type has become popular, especially as sports sunglasses. The spectacle frame of the wraparound type has a characteristic that, since the spectacle frame of the wraparound type has a large bend angle to bend around a face, even the sides of the face are covered by lenses and the field of view is wide. Therefore, a spectacle frame of the wraparound type is popular among athletes as a frame for safety spectacles used during sports and for general eye protection.

The wraparound type spectacle lens is provided with an optical convex surface on an object side and an optical concave surface on an eye side and is mounted in the spectacle frame in a manner tilting with respect to a line of sight (JP-A-2005-284059).

The optical concave surface of the spectacle lens is prescribed for near-sightedness correction, far-sightedness correction or the like depending on eyesight of a user. Thus, spectacle lenses are typically designed in variation, but spectacle frames in which the spectacle lenses are mounted are often standardized.

Typically, a spectacle lens is mounted in a spectacle frame using an outer shape of the spectacle frame as a reference. Specifically, a spectacle lens is mounted in a spectacle frame so that an optical convex surface on an object side conforms to the outer shape of the spectacle frame.

In a spectacle lens, light that enters from the object side refracts at the optical convex surface and linearly travels in the lens, before the light retracts again at the optical concave surface and enters a pupil of a user.

Since the optical concave surface on the eye side is prescribed in correspondence with eyesight or the like of a user, the surface differs from one lens to another.

A typical spectacle lens is mounted in a spectacle frame using only the outer shape of the spectacle frame as a reference. Thus, a prescription made on the optical concave surface on an eye side may cause the optical concave surface to form an inappropriate angle with respect to the spectacle frame.

When the optical concave surface tilts relative to the appropriate angle, an average dioptric power error, an astigmatic aberration, and a prismatic error occur. A user may suffer eyestrain or the like due to such errors.

SUMMARY

An advantage of some aspects of the invention is to provide: a method for designing a spectacle lens that is less likely to cause an error irrespective of prescription made on an optical concave portion on an eye side; and spectacles.

The invention is made to deal with errors such as a dioptric power error that occur when the spectacle lens is mounted in a spectacle frame with the optical surface tilting with respect to the appropriate angle.

Specifically, a method according to an aspect of the invention for designing a spectacle lens that includes an optical convex surface on an object side of the spectacle lens and an optical concave surface on an eye side of the spectacle lens and is mounted in a spectacle frame in a manner tilting with respect to a forward sight line, the optical convex surface being spherical, the optical concave surface being optically curved according to a prescription includes: defining a design reference point at an intersection of the optical concave surface and the forward sight line; and determining an angle formed by a tangent line at the design reference point and a perpendicular plane perpendicular to the forward sight line as a lens tilt angle $\theta$ with which the spectacle lens is mounted in the spectacle frame.

According to the aspect of the invention, the lens tilt angle $\theta$ is obtained for each spectacle lens, and the spectacle lens is mounted in the spectacle frame in correspondence with the lens tilt angle $\theta$.

Accordingly, unfavorable tilt of the optical concave surface can be prevented by setting the lens tilt angle $\theta$, so that the spectacle lens can be mounted in the spectacle frame with the optical concave surface being in the appropriate angle irrespective of prescription for near-sightedness, far-sightedness or the like. Therefore, the average dioptric power error, the astigmatic aberration, and a prismatic error are reduced to prevent eyestrain or the like suffered by a spectacle user.

In the above aspect of the invention, it is preferable that the optical concave surface is aspherical.

With the above arrangement, the average dioptric power error, the astigmatic aberration, and the prismatic error can be further reduced.

In the above arrangement, it is preferable that the method for designing the spectacle lens further includes: obtaining the lens tilt angle $\theta$ from: an inter-pupil distance; an edged lens width of the spectacle lens; a front bend angle formed by a line and the perpendicular plane perpendicular to the forward sight line; the line connecting peripheral edges that oppose to each other across the optical convex surface; a bridge length defined by a dimension between the spectacle lens and a neighboring spectacle lens used together with the spectacle lens; a front curvature indicated by a radius of curvature of the optical convex surface; and a center thickness of the spectacle lens.

With the above arrangement, since parameters for defining the lens tilt angle $\theta$ are determined independently of the shape of the optical concave surface that differs from one prescription to another, the lens tilt angle $\theta$ is easily obtained.

In the above arrangement, it is preferable that the method for designing the spectacle lens further includes: obtaining a formula of a sphere of the optical convex surface of the spectacle lens from the edged lens width of the spectacle lens, the front bend angle, the bridge length, and the front curvature; obtaining a formula of a tangent line of the sphere that passes through an intersection of the sphere and a parallel line parallel to the forward sight line; selecting an appropriate incident light ray by setting requirements of a plurality of light rays entering a pupil for the equation of the tangent line and calculating to obtain the appropriate incident light ray whose corresponding exiting light ray that exits from the spectacle lens passes through the pupil under the requirements, and determining an angle formed by an appropriate tangent line associated with the appropriate incident light ray and the perpendicular plane as the lens tilt angle $\theta$.

With the above arrangement, the formula of the sphere of the optical convex surface on the object side is used with a parallel line parallel to the forward sight line to obtain a formula of the parallel line touching the sphere, that is, the tangent line on the sphere.

Upon the calculation, the optical convex surface on the object side of the spectacle lens and the optical concave surface on the eye side of the spectacle lens are approximated to a plate-shaped prism having two parallel surfaces. A light ray entering the object-side surface of the plate prism is refracted once and travels linearly in the plate. Subsequently, the light ray is refracted again and exits to the eye side from the eye side surface. Here, since an angle formed by the incident and exit surfaces of the plate and the plane perpendicular to the forward sight line varies depending on a position of the incident light ray, an exiting position is obtained by simulation for each of the light rays, and one of the incident light rays exiting at a position that aligns with the forward sight line is obtained by, for example, the convergent calculating method.

The angle formed by the incident surface of the incident light ray whose corresponding exiting light ray aligns with the forward sight line is determined as the lens tilt angle $\theta$.

Accordingly, the tilt of the optical concave surface can be obtained by calculation using the aforementioned parameters irrespective of the prescription, so that more accurate lens tilt angle $\theta$ can be determined.

Spectacles according to another aspect of the invention includes: a spectacle lens designed by a method for designing a spectacle lens according to the above arrangement(s); and a spectacle frame in which the spectacle lens is mounted.

With the aspect of the invention, spectacles capable of providing the above effects can be provided.

BRIEF DESCRIPTION OF THE DRAWINGS

The invention will be described with reference to the accompanying drawings, wherein like numbers reference like elements.

FIGS. 4(a) to (d) are schematic views showing a manufacturing process of the spectacle lens.

DESCRIPTION OF EXEMPLARY
EMBODIMENT(S)

A method for designing a spectacle lens according to an exemplary embodiment of the invention will be described below with reference to the drawings.

Figure 1:
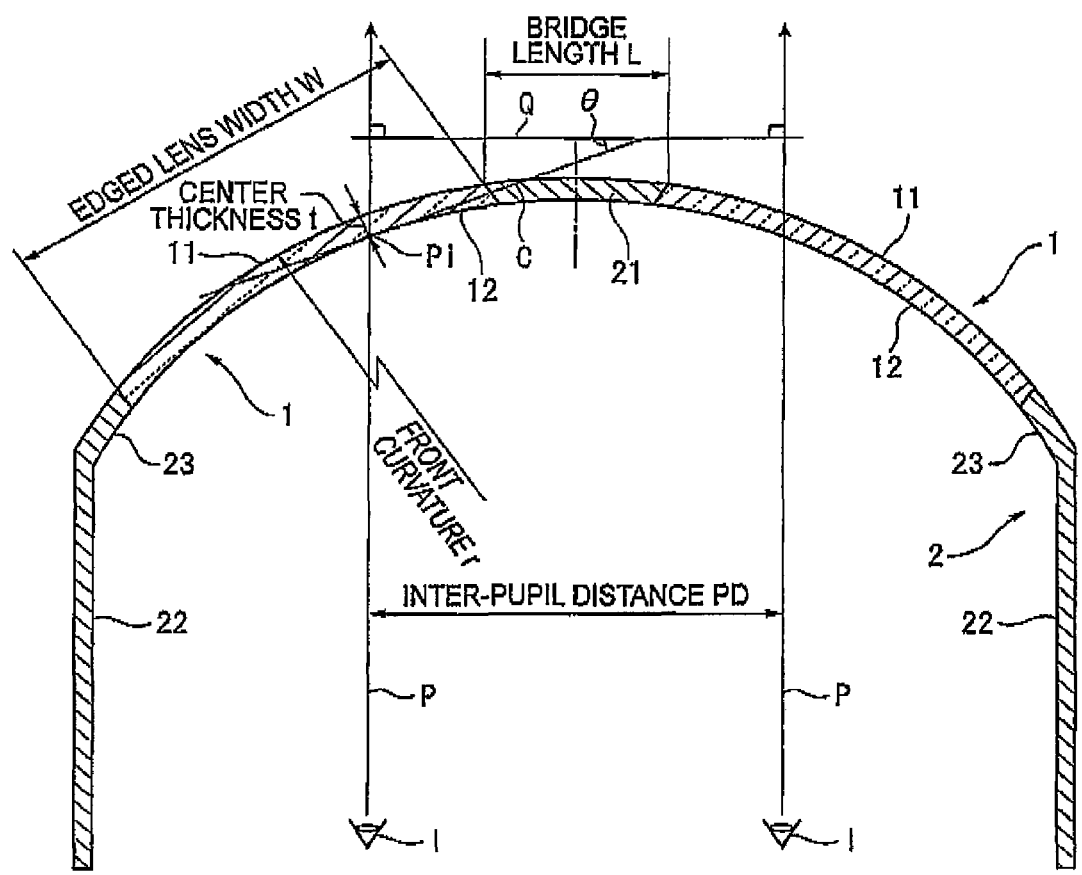
FIG. 1 is a schematic horizontal cross section of spectacles according to an exemplary embodiment of the invention.

FIG. 1 is a schematic horizontal cross section of the spectacle according to the exemplary embodiment.

In FIG. 1, spectacles are provided with two spectacle lenses 1, each of which is mounted in the spectacle frame 2 in a manner tilting with respect to a forward sight line P.

The spectacle lens 1 is a meniscus lens having an optical convex surface 11 on an object side and an optical concave surface 12 on an eye side. The spectacle lens 1 is shaped in a sphere, and a radius of curvature, that is, a front curvature r, of the optical convex surface 11 has a predetermined dimension.

The spectacle frame 2 is a spectacle frame having a bend angle of 200° or larger such as a wraparound type spectacle frame or the like. A bridge 21 whose front side is substantially spherically curved and with which the spectacle is supported to a nose, a temple 22 with which the spectacle is supported to an ear, and a rim 23 in which the spectacle lens 1 is mounted are integrally formed in the spectacle frame 2.

The optical convex surface 11 of the spectacle lens 1 is shaped in a sphere. The spectacle lens 1 is mounted in the spectacle frame 2 in a manner that the sphere of the spectacle lens 1 corresponds to the curved portion of the sphere on the front side of the spectacle frame 2.

Since the optical concave surface 12 is prescribed for near-sightedness, far-sightedness or the like as necessary, the optical concave surface 12 is aspherical.

Two forward sight lines P are defined in parallel to each other in the spectacles. A distance between the forward sight lines P will be referred to as an inter-pupil distance PD. The inter-pupil distance PD is modified for each user.

A nose width dimension of the bridge 21 of the spectacle frame 2 is defined as a bridge length L. The bridge length L is a linear dimension on the front side of the bridge 21 in a plane including the forward sight line P. The bridge length L is also a dimension between edges of the optical convex surfaces 11 of the neighboring spectacle lenses 1.

Figure 2:
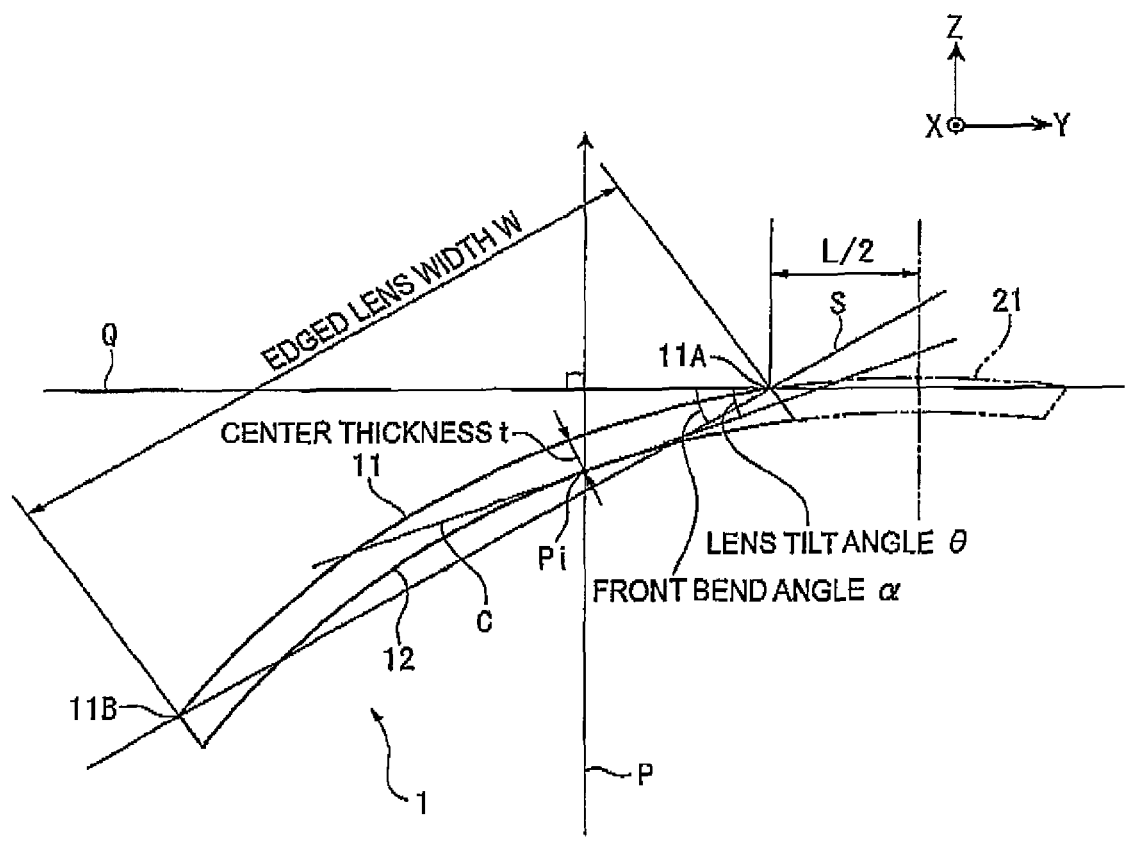
FIG. 2 is an enlarged schematic view of a spectacle lens fitted in a spectacle frame.

FIG. 2 is an enlarged schematic figure of the spectacle lens 1.

In FIG. 2, an edged lens width of the spectacle lens 1 is denoted with W and a front bend angle of the spectacle lens 1 is denoted with a. The edged lens width W is a dimension between opposite edges 11A and 11B of the optical convex surface 11 in a plane including the forward sight lines P. The front bend angle a is defined by an angle formed by a line S connecting the edges 11A and 11B of the optical convex surface 11 in the plane including the two forward sight lines P and a plane Q perpendicular to the forward sight lines P.

The optical concave surface 12 meets the forward sight line P at a design reference point Pi. A tangent line C of the optical concave surface 12 is in a horizontal plane including the two forward sight lines P and passes through the design reference point Pi. The tangent line C and the plane Q perpendicular to the forward sight lines P form a lens tilt angle $\theta$.

A thickness of the spectacle lens 1 at the design reference point Pi is referred to a center thickness t.

Next, a method for designing the spectacle lens according to the exemplary embodiment will be described with reference to FIG. 3.

Figure 3:
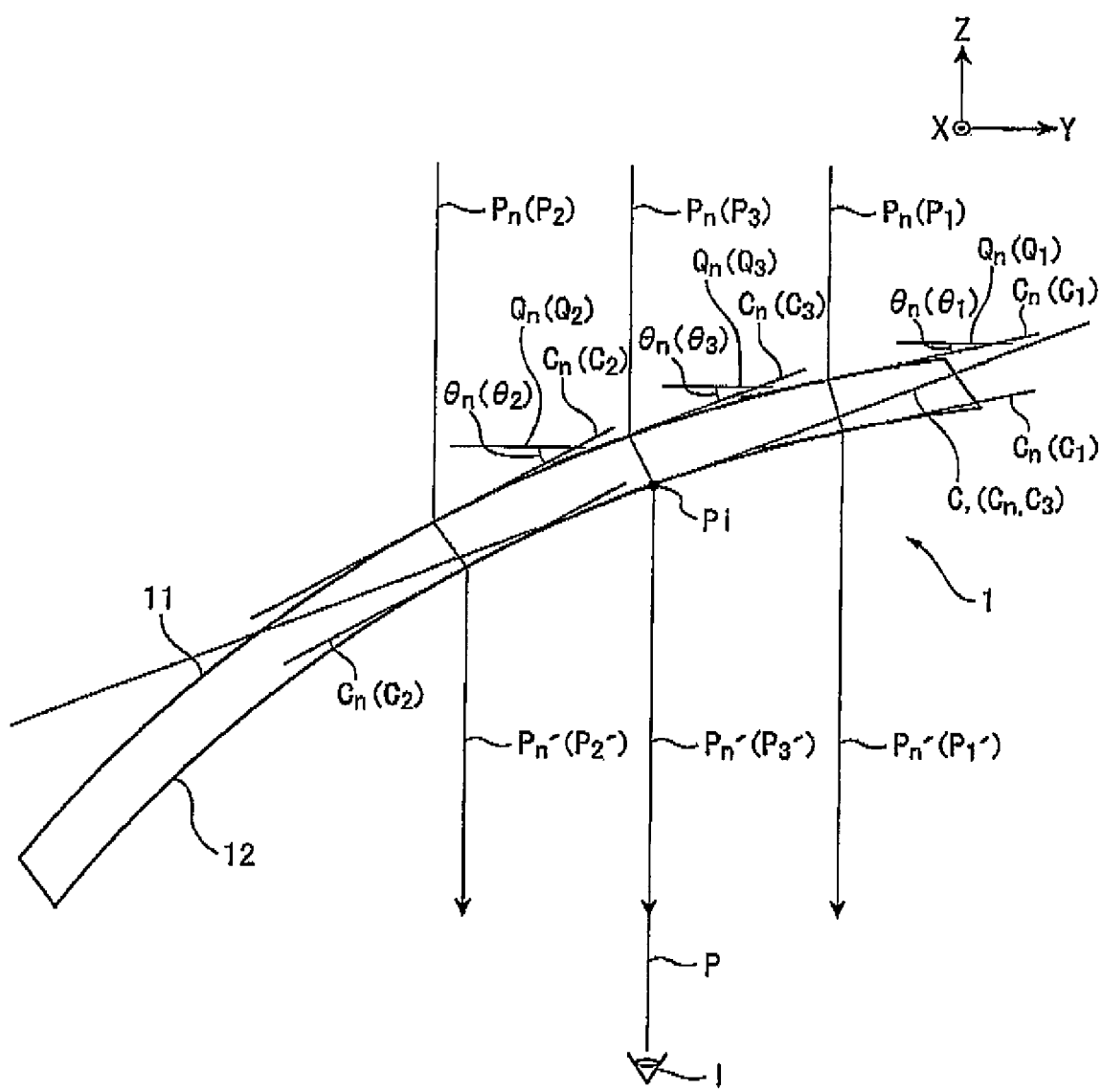
FIG. 3 is a schematic view for describing a method for designing a spectacle lens.

FIG. 3 is a schematic view that helps describe a method for designing the spectacle lens 1.

An equation of the sphere of the optical convex surface 11 of the spectacle lens is obtained from the edged lens width W, the front bend angle a, the bridge length L, and the front curvature r.

The equation of the sphere of the optical convex surface 11 is $$(X-Xo)^2+(Y-Yo)^2+(Z-Zo)^2=r^2.$$

Xo, Yo, and Zo, which are coordinates of a center of the sphere, are obtained from the edged lens width W, the front bend angle a, and the bridge length L of the spectacle lens 1.

The tangent line Cn of the sphere, which passes through an intersection of the sphere and a light ray Pn parallel to the forward sight lines P, is also obtained.

Requirements of a plurality of the light rays Pn (n=1, 2, 3, . . . ) entering the pupil are set for the equation of the tangent line Cn, and an exiting light ray Pn passes through the pupil I under the requirements is calculated by the convergent calculating method to select an appropriate incident light ray (see, FIG. 3).

Upon the calculation, the optical convex surface 11 on the object side of the spectacle lens 1 and the optical concave surface 12 on the eye side of the spectacle lens 1 are approximated to two tangent lines Cn parallel to each other. A dimension of the spectacle lens 1 is determined so that the distance between the two tangent lines Cn is the same as the center thickness t of the spectacle lens 1. In other words, the spectacle lens 1 in which the optical concave surface 12 and the optical convex surface 11 have different tilt angles is assumed to be a plate-shaped prism which has an incident surface and an exit surface parallel to each other.

The light ray Pn having entered the object-side surface refracts once and travels linearly in the inside. Subsequently, the light ray Pn refracts again at the eye side surface and exits to the eye side to become a light ray Pn'.

An angle θn formed by the tangent line Cn (i.e., the incident surface) and the plane Qn perpendicular to the forward sight line P varies depending on a position of the incident light ray Pn in the horizontal plane.

As shown in FIG. 3, if the incident light ray Pn is a light ray $P_1$ taking a rightmost position, the light ray $P_1$ refracts at the tangent line $C_1$ on the incident side and refracts again at the tangent line $C_1$ on the exit side to become an exiting light ray $P_1'$. In this case, the plane $Q_1$ and the tangent line $C_1$ form an angle $\theta_1$.

If the incident light ray Pn is a light ray $P_2$ taking a leftmost position, the light ray $P_2$ refracts at the tangent line $C_2$ on the incident side and refracts again at the tangent line $C_2$ on the exit side to become an exiting light ray $P_2'$. In this case, the plane $Q_2$ and the tangent line $C_2$ form an angle $\theta_2$. The angle $\theta_2$ is larger than the angle $\theta_1$.

Accordingly, the exiting light ray Pn' is simulated for each of the incident light rays Pn.

A desirable incident light ray Pn whose counterpart light ray Pn' exits the spectacle lens 1 in a manner aligning with the forward sight line P is obtained by, for example, the convergent calculating method.

Initially, a first light ray $P_1$ is radiated, and a distance (a dimension in the Y-axis direction of FIG. 3) between an exiting light ray $P_1'$ of this light ray $P_1$ and the forward sight line P is obtained. If the distance takes a plus value, a second light ray $P_2$ is radiated from a minus direction, a distance between the exiting light ray $P_2'$ of the light ray $P_2$ and the forward sight line P is obtained. If the distance takes a minus value, a third light ray $P_3$ is radiated at a position between the light rays $P_1$ and $P_2$. This simulation is repeated until the exiting light ray Pn' aligns with the forward sight line P. The incident surface (e.g., the tangent line $C_3$) of such an aligning incident light ray Pn (e.g., the incident light ray $P_3$) and the perpendicular plane $Q_3$ form an angle $\theta_3$, which is determined as the lens tilt angle θ.

In the exemplary embodiment, incidentally, a prism adjustment is conducted as necessary.

Next, a method for manufacturing the spectacle lens 1 designed according to the designing method for the exemplary embodiment will be described with reference to FIG. 4. In the exemplary embodiment, a semifinished lens blank is molded by cast molding to obtain the spectacle lens 1.

FIGS. 4(a) to (d) are schematic cross sections showing a manufacturing process of the spectacle lens 1.

As shown in FIG. 4(a), two casting molds, i.e., a first casting mold 110 and a second casting mold 120, are employed in the embodiment. The first casting mold 110 has a convex surface 111 for molding the concave surface side of the semifinished lens blank and a lower surface 112 not for molding. The second casting mold 120 has a concave surface 121 for molding the convex surface of the semifinished lens blank and an upper surface 122 not for molding.

The first casting mold 110 is a glass mold. Both the convex surface 111 for molding and the lower surface 112 are spherically formed. The first casting mold 110 has a substantially uniform thickness. Not only the convex surface 111 but also the lower surface 112 are optically formed. A spherical center of the convex surface 111 and a spherical center of the lower surface 112 both reside on a geometric center line, and the convex surface 111 for molding and the lower surface 112 are rotationally symmetrical surfaces whose symmetrical axis is formed by the geometric center line.

The second casting mold 120 is a glass mold. Both the molding surface of the concave surface 121 and the upper surface 122 are spherical. The upper surface 122 a well as the concave surface 121 are optically formed. A spherical center of the upper surface 122 resides on a geometric center line, so that the upper surface 122 is a rotationally symmetric surface whose symmetric axis is formed by the geometric center line. The concave surface 121 is a tilted sphere whose center is apart from the geometric center line toward the ear. Accordingly, the second casting mold 120 does not have a uniform thickness. A prismatic refractive effect is generated on a geometric center line of a lens whose, both surfaces are spherical and whose thickness is uneven. A fitting point is set as a reference point on a front surface of the lens. More specifically, the fitting point is set at a predetermined position apart from the geometric center of the concave surface 121 of the second casting mold 120 where the thickness of the second casting mold 120 is increased. On the concave surface 121 of the second casting mold 120, a hidden mark (not shown) for notifying a position of the referential fitting point is marked. For example, the hidden mark is marked at positions opposite across and equally distant from the fitting point. The hidden mark is transcribed on the convex surface 31 of the semifinished lens blank 3 (see, FIG. 4(c)).

As shown in FIG. 4(b), the first casting mold 110 and the second casting mold 120 are disposed so that, when externally observed, lateral sides of the first casting mold 110 and the second casting mold 120 align in a manner that the convex surface 111 of the first casting mold 110 and the concave surface 121 of the second casting mold 120 face each other and are apart from each other by a predetermined distance. While positions of the first casting mold 110 and the second casting mold 120 are maintained, an adhesive tape 130 is wound around the lateral side of the first casting mold 110 and the lateral side of the second casting mold 120 in a manner striding over a boundary between the lateral side of the first casting mold 110 and the lateral side of the second casting mold 120. Then, a gap between the first casting mold 110 and the second casting mold 120 is sealed by the adhesive tape 130 to form a cavity 140 to provide a casting mold 150 for lens cast molding.

In the assembled casting mold 150, the lower surface 112 and the convex surface 111 of the first casting mold 110 and the upper surface 122 of the second casting mold 120 are spheres whose centers reside on the geometric center line, and the concave surface 121 of the second casting mold 120 includes a tilted sphere whose center does not reside on the geometric center line unlike the other three surfaces.

Next, a lens material is filled in the cavity 140, which is a sealed space surrounded by the first casting mold 110 and the second casting mold 120 of the casting mold 150 and the adhesive tape 130. Subsequently, light energy or heat energy is applied to the lens material for polymerization curing.

After polymerization curing, the adhesive tape 130 is peeled away and the first casting mold 110 and the second casting mold 120 are separated to obtain the semifinished lens blank 3 as shown in FIG. 4(c). The convex surface 31 and the concave surface 32 of the semifinished lens blank 3 each includes a sphere and has a prismatic refractive effect on the geometric center line. The semifinished lens blank 3 is an eccentric lens whose fitting point is deviated from the geometric center toward the nose.

As shown in FIG. 4(d), the concave surface 32 on the eye side of the obtained semifinished lens blank 3 is cut and grinded before being mirror-finished to yield the optical concave surface 12.

The manufactured spectacle lens 1 is mounted in the spectacle frame 2. Upon selection of the spectacle lens 1, the lens tilt angle θ is also taken into consideration as a reference.

Thus, the following advantages are obtained in the exemplary embodiment.

(1) The intersection of the optical concave surface 12 and the forward sight lines P is set as the design reference point Pi. A lens tilt angle θ formed by the tangent line C at the design reference point Pi and the plane Q perpendicular to the forward sight lines P is used to design the spectacle lens 1. Therefore, even if the optical concave surface 12 has a complicated aspherical shape as a result of a prescription, occurrence of an average dioptric power error, an astigmatic aberration, or a prismatic error is prevented.

(2) The lens tilt angle θ can be obtained from the inter-pupil distance PD, the edged lens width W, the front bend angle a, the bridge length L, the front curvature r, and the center thickness t of the spectacle lens 1. Thus, because these parameters are determined irrespective of the aspherical shape of the optical concave surface 12 that differ from one prescription to another, the lens tilt angle θ can be easily obtained by simulation with a computer or the like.

(3) The lens tilt angle θ is determined as follows. The equation of the sphere of the optical convex surface of the spectacle lens is obtained from the edged lens width W, the front bend angle a, the bridge length L, and the front curvature r of the spectacle lens 1. The equation of the tangent line Cn of the sphere that passes through the intersection of the sphere and the light ray Pn parallel to the forward sight lines P is obtained. The requirements of the light rays Pn that enter the pupil I are set for the formula of the tangent line C. The appropriate incident light ray is selected by calculating the light ray Pn whose counterpart exiting light ray Pn' passes through the pupil I under the aforementioned requirements. An angle formed by the tangent line and the perpendicular plane in the case of the selected light ray is determined as the lens tilt angle θ. Because the optical convex surface 11 on the object side and the optical concave surface 12 on the eye side of the spectacle lens 1 are approximated to be two parallel surfaces parallel to each other to facilitate calculation, the lens tilt angle θ can be obtained by the convergent calculating method or the like irrespective of the prescription. Therefore, a more accurate lens tilt angle θ can be set.

(4) When the semifinished lens blank 3, whose both surfaces are spherically formed and which has a prismatic refractive effect on the geometric center line, is manufactured, the first casting mold 110 having the spherical optical convex surface 111 and the second casting mold 120 having the spherical optical concave surface 121 are opposed to each other in a manner that the geometric centers of the molds align with each other and that the semifinished lens blank 3 to be molded has a prismatic refractive effect on the geometric center line. Therefore, the lens shape of the spectacle lens suitable for the wraparound type spectacle frame can be obtained even using the semifinished lens blank having a diameter for a normal spectacle lens.

Note that the invention is not limited to the above exemplary embodiment, but the modifications, improvements and the like are included in the scope of the invention as long as an object of the invention can be achieved.

For example, in the exemplary embodiment, the lens tilt angle θ is obtained by the convergent calculating method or the like. Nevertheless, according to the invention, a method for obtaining the lens tilt angle θ is not limited to the convergent calculating method. For instance, other calculating methods commonly used in mathematics may be employed.

In addition, according to the invention, both sides of the lens blank may undergo polishing or the like in manufacturing the spectacle lens 1.

Moreover, according to the invention, the optical concave surface 12 may be spherical.

The invention cant be applied to a spectacle lens mounted in a wraparound type spectacle frame.

What is claimed is:

1. A method for calculating a tilt angle of a spectacle lens that comprises an optical convex surface on an object side of the spectacle lens and an optical concave surface on an eye side of the spectacle lens and is mounted in a spectacle frame in a manner tilting with respect to a forward sight line, the optical convex surface being spherical, the optical concave surface being optically curved according to a prescription, the method comprising:

defining a design reference point at an intersection of the optical concave surface and the forward sight line;

obtaining: an inter-pupil distance; an edged lens width of the spectacle lens; a front bend angle formed by a line and a plane perpendicular to the forward sight line, the line connecting peripheral edges that oppose to each other across the optical convex surface; a bridge length defined by a dimension between the spectacle lens and a neighboring spectacle lens used together with the spectacle lens; a front curvature defined by a radius of curvature of the optical convex surface; and a center thickness of the spectacle lens;

obtaining a formula of a sphere of the optical convex surface of the spectacle lens from the edged lens width, the front bend angle, the bridge length, and the front curvature;

while approximating the optical convex surface and the optical concave surface to a plate-shaped prism having parallel object-side surface and eye-side surface, obtaining optical paths of a plurality of light rays that enter the object-side surface of the prism, refract in the prism to go straight to be refracted again by the eye-side surface of the prism to be emitted to the eye side;

obtaining one of the plurality of light rays of which optical path after exiting the eye-side surface aligns with the forward sight line;

setting the design reference point at the exiting position of the one of the plurality of light rays of which optical path after exiting the eye-side surface aligns with the forward sight line; and calculating an angle formed by a plane perpendicular to the forward sight line and a tangent line at the design reference point, the angle being set as the tilt of the lens.

2. The method for calculating a tilt angle of the spectacle lens according to claim 1, wherein the optical concave surface is aspherical.

3. Spectacles, comprising:

a spectacle lens of which tilt angle is calculated by the method according to claim 1; and a spectacle frame in which the spectacle lens is mounted.

4. A manufacturing method of a spectacle lens, the spectacle lens comprising an optical convex surface on an object side of the spectacle lens and an optical concave surface on an eye side of the spectacle lens, the spectacle lens being mounted in a spectacle frame in a manner tilting with respect to a forward sight line, the optical convex surface being spherical, the optical concave surface being optically curved according to a prescription, the method comprising:

defining a design reference point at an intersection of the optical concave surface and the forward sight line;

obtaining: an inter-pupil distance; an edged lens width of the spectacle lens; a front bend angle formed by a line and a plane perpendicular to the forward sight line, the line connecting peripheral edges that oppose to each other across the optical convex surface; a bridge length defined by a dimension between the spectacle lens and a neighboring spectacle lens used together with the spectacle lens; a front curvature defined by a radius of curvature of the optical convex surface; and a center thickness of the spectacle lens, obtaining a formula of a sphere of the optical convex surface of the spectacle lens from the edged lens width, the front bend angle, the bridge length, and the front curvature;

while approximating the optical convex surface and the optical concave surface to a plate-shaped prism having parallel object-side surface and eye-side surface, obtaining optical paths of a plurality of light rays that enter the object-side surface of the prism, refract in the prism to go straight to be refracted again by the eye-side surface of the prism to be emitted to the eye side;

obtaining one of the plurality of light rays of which optical path after exiting the eye-side surface aligns with the forward sight line;

setting the design reference point at the exiting position of the one of the plurality of light rays of which optical path after exiting the eye-side surface aligns with the forward sight line;

calculating an angle formed by a plane perpendicular to the forward sight line and a tangent line at the design reference point, the angle being set as the tilt angle of the lens; and attaching the spectacle lens to the spectacle in accordance with the tilt angle of the lens.

5. The manufacturing method of a spectacle lens according to claim 4, wherein the optical concave surface is aspherical.

* * * * *